United States Patent Office 3,019,210
Patented Jan. 30, 1962

3,019,210
POLYAMIDE OXIDATION INHIBITING PROCESSES AND RESULTING PRODUCTS
Richard C. Gilles, Reading, Pa., assignor to The Polymer Corporation, Reading, Pa., a corporation of Pennsylvania
No Drawing. Filed Aug. 5, 1958, Ser. No. 753,211
9 Claims. (Cl. 260—45.7)

This invention relates to the formation of compositions and articles from high melting synthetic linear polyamide materials, such as polyhexamethylene adipamide, polyhexamethylene sebacamide and polymerized epsilon aminocaproic acid (caprolactam), such high melting polyamides commonly being known as nylon. The invention is particularly concerned with inhibiting oxidation of these polyamide materials.

Although the nylons have many physical properties which make them desirable for use in numerous industrial applications, these materials are subject to severe oxidation at elevated temperatures, oxidation being an increasing problem as the temperature increases.

It is therefore an important object of the invention to provide processes by which nylon materials can be formed into desired shapes while minimizing the chances of encountering detrimental oxidation. A further object of the invention is the provision of compositions from which articles can be formed and shaped articles which are characterized by a high degree of resistance to oxidation at elevated temperatures.

I have found that adding an alkali metal silicate to nylon materials results in a striking and unexpected reduction in the susceptibility of the nylon to oxidation.

There are a number of ways by which the alkali metal silicates can be used to inhibit polyamide oxidation.

A silicate may be incorporated with a polyamide by first dissolving the silicate in water and then mixing the solution with finely divided polyamide. Thereafter the mixture is dried and is then ready to be formed into useful shapes.

One especially important application of the invention relates to the sintering type of nylon article formation technique. According to this technique a finely divided nylon powder is first prepared by dissolving the nylon in a solvent and then precipitating the nylon from the solution either by the addition of a chemical precipitator agent, or, when the solvent used is a solvent only at elevated temperature and is a non-solvent at room temperature, by cooling the solution. The nylon powder resulting from such a precipitation technique is exceptionally fine—considerably finer than any nylon powder which can at the present time be obtained by mechanical grinding, etc. The ultimate particle size of the precipitated powder nylon may be on the order of several microns. For the purposes of sintering articles, the powder should have an average ultimate particle size of less than 40 microns.

After the precipitated powder nylon is prepared, a green article is cold pressed from the powder, the pressing being carried out under a pressure sufficient to form a green article capable of being handled. In general, the pressing force required runs from about 5 to 10 tons per square inch up to about 25 tons per square inch.

After the cold pressing operation the green article is removed from the press and heated to an elevated temperature. When pure, unfilled nylon is being formed, the sintering temperature advantageously runs from about a few degrees below the melting point down to about 25 to 50° below the melting point of the polyamide. When large proportions of a filler material are used, it is desirable to fuse the polyamide by using temperatures above the melting point of the polyamide. This technique is more fully disclosed and claimed in copending application of William J. Davis, Serial No. 753,189, executed August 1, 1958, filed August 5, 1958, entitled Fused Filled Nylon, and assigned to the assignee of the present application.

In the sintering and in the fusing techniques mentioned above, it is always necessary to take great care during the heating step to avoid oxidizing the article being formed. By the use of special equipment and special techniques this can be accomplished by providing non-oxidizing conditions, such as vacuum, nitrogen, carbon dioxide, or other non-oxidizing atmosphere, or an oil, or other non-oxidizing liquid bath, such as a molten metal bath.

By adding an alkali metal silicate to the polyamide according to the present invention, the above-mentioned special precautions during sintering can be completely avoided. The green articles can simply be sintered by heating them in an ordinary air oven.

According to another aspect of the invention the addition of an alkali metal silicate can be utilized in techniques for forming continuous shapes, such as rod stock, from the polyamide materials. Such techniques involve feeding solid flake or granular polyamide into the feed hopper of a heated screw device, advancing and melting the polyamide in the screw feed device, delivering molten polyamide from the screw feed device into the entrance end of an elongated open-ended forming tube, and cooling the polyamide to solidification while it is advancing through the forming tube. In such techniques oxidation of the nylon during the rod formation can sometimes be a problem. However, of greater significance, is the problem of avoiding oxidation in subsequent heat treatments found to be advantageous in many instances for a variety of purposes, such as the relief of internal strains, etc.

The present invention provides a method of increasing the oxidation resistance of the shape being formed in such a technique, the method comprising mixing the flake or granular polyamide with a sufficient quantity of an alkali metal silicate to materially increase the oxidation resistance of the polyamide and feeding the mixture into the screw feed device. The tubing or rod stock which results is characterized by an exceptionally high resistance to oxidation.

It is advantageous for the purposes of the present invention to utilize those alkali metal silicates which are characterized by a high degree of water solubility, those of particular importance both because of their water solubility and also because of their low relative cost, being the silicates, metasilicates, sesquisilicates and orthosilicates of sodium and potassium.

As has already been indicated, it is possible with the present invention to incorporate certain fillers in compositions and articles comprising polyamide material and an alkali metal silicate.

With respect to the quantity of alkali metal silicate which it is necessary to add in order to accomplish the desirable results of the invention, it may be said in general that the quantity must be sufficient to materially inhibit oxidation of the polyamide, such amount often being at least about 10% by weight of the polyamide. If excessive amounts of the silicates are added, there may be a tendency to reduce the strength of the resulting article. I have found that additions of the silicate beyond about 40% by weight of the polyamide tend to decrease the article's strength and, furthermore, are unnecessary since virtual complete elimination of oxidation as a problem can be accomplished without exceeding such quantity of the silicate. With respect to nylon incorporating fillers, it can generally be said that the greater the proportion of the filler, the less silicate will be needed in order to materially inhibit oxidation.

A number of specific examples of the process and products of the invention follow.

Example I

Polyhexamethylene adipamide powder (melting point 507° F.) was prepared by precipitation from solution. 10% sodium metasilicate by weight of the polyamide was dissolved in enough water to "wet out" a batch of polyamide powder. After mixing the solution and powder, the resulting clay-like mixture was spread out and dried in an oven. Thereafter the dried nylon powder incorporating the sodium metasilicate was fed into the hopper of a heated screw feed device and a tube having 1/8" outside diameter and .080" inside diameter was formed. The tubing was heated in an air oven to 450° F. and held for two hours. Virtually no change in color occurred indicating that there was substantially no oxidation of the polyamide. By comparison a similarly prepared sample of commercially available nylon (oxidation inhibited by prior techniques) turned completely black during the heating.

Example II

A powder consisting of 60% polyhexamethylene adipamide and 40% polymerized epsilon aminocaproic acid (the melting point of the mixture being about 500° F.) was coprecipitated from solution. 40% sodium metasilicate by weight of the polyamide was dissolved in water and the solution was mixed with a batch of the nylon powder and subsequently dried in the manner set forth in Example I. A green article was formed from the powder by pressing the powder under 20 tons per square inch at room temperature. The green article was removed from the mold and sintered in air at 450° F. The resulting piece was of good strength and showed no evidence of oxidation.

Example III

Polymerized epsilon amino caproic acid powder (melting point 430° F.) was prepared by precipitation from solution. 45 parts by volume of this powder was mixed in dry state with 55 parts by volume of calcium carbonate as a filler. 10% sodium metasilicate by weight of the polyamide was dissolved, mixed with the powder, and the mixture was then dried in the manner set forth in Example I. The resulting material was pressed at room temperature in a mold under a pressure of 20 tons per square inch to form a green article capable of being handled. The green article was removed from the mold and sintered in air at a temperature of 450° F. The resulting piece was of good strength and showed no evidence of oxidation. A similar piece made from the polyamide and filler mixture without the addition of any sodium metasilicate completely degraded during sintering.

Example IV

Polyamide and calcium carbonate were combined with sodium metasilicate in the manner set forth in Example III. The resulting powder was heated in air to 470° F. and held at that temperature for one hour. The powder at the end of this treatment showed no evidence of oxidation. It was exceptionally free flowing. This powder was pressed and air sintered as set forth in Example III and yielded an article of good strength showing no evidence of oxidation.

I claim:

1. The method of forming a shape from high melting synthetic linear polyamide particles which comprises coating the particles with an alkali metal silicate and thereafter compacting the particles and subjecting the compacted particles to heat.

2. A composition comprising particles of high melting synthetic linear polyamide, which particles are coated with an alkali metal silicate.

3. An article formed from coated particles of high melting synthetic linear polyamide, the coating on the particles consisting essentially of an alkali metal silicate.

4. An article made of a high melting synthetic linear polyamide incorporating from about 10% to about 40% by weight of the polyamide of an alkali metal silicate, the silicate being dispersed throughout the polyamide.

5. A shaped polyamide article comprising sintered high melting synthetic linear polyamide particles and an oxidation inhibitor, the polyamide particles prior to the sintering having an average ultimate particle size of less than 40 microns, the oxidation inhibitor being an alkali metal silicate and being present in quantity sufficient to materially inhibit oxidation but not more than about 40% by weight of the polyamide.

6. A composition for use in forming sintered articles, comprising particles of high melting synthetic linear polyamide coated with an alkali metal silicate.

7. A method of forming a shaped polyamide article which comprises the steps of dissolving an oxidation inhibitor in water, mixing the resulting solution with finely divided high melting synthetic linear polyamide material, drying the resulting mixture, cold compressing the mixture to a predetermined shape in a mold to form a green article, removing the green article from the mold and sintering same in air to form a shaped polyamide article, the compressing step being carried out with sufficient pressure to allow the resulting green article to be handled, the oxidation inhibitor comprising an alkali metal silicate and being present in quantity sufficient to materially inhibit oxidation but not sufficient to materially reduce the strength of the article.

8. In a process of forming continuous shapes from high melting synthetic linear polyamides which involves feeding solid flake or granular polyamide into the feed hopper of a heated screw feed device, advancing and melting the polyamide in the screw feed device, delivering molten polyamide from the screw feed device into the entrance end of an elongated open-ended forming tube, and cooling the polyamide to solidification while it is advancing through the forming tube, the method of increasing the oxidation resistance of the shape being formed which comprises the steps of mixing the flake or granular polyamide with a sufficient quantity of an alkali metal silicate to materially increase the oxidation resistance of the resulting shape but not sufficient to materially reduce the strength thereof, and feeding the resulting mixture into the screw feed device.

9. The method of inhibiting oxidation of high melting synthetic linear polyamide material which comprises, dissolving an alkali metal silicate in water, applying the resulting solution to the polyamide, and drying the polyamide to form a coating of the silicate on the polyamide, said coating being thick enough to materially inhibit oxidation of the polyamide.

References Cited in the file of this patent
UNITED STATES PATENTS

| | | |
|---|---|---|
| 2,201,741 | Owens et al. | May 21, 1940 |
| 2,341,759 | Catlin | Feb. 15, 1944 |
| 2,342,823 | Schlack | Feb. 29, 1944 |
| 2,698,966 | Stott et al. | Jan. 11, 1955 |